United States Patent Office 3,287,445
Patented Nov. 22, 1966

3,287,445
IMPACT-RESISTANT GRAFT POLYMER OF STYRENE ONTO A POLYMERIC p - ISOPROPYL - 2-METHYLSTYRENE/ALKYL ACRYLATE SUBSTRATE
Karl-Heinz Ott, Cologne-Stammheim, Karl-Heinrich Knapp, Leverkusen, Harry Rohr, Cologne, and Karl Dinges, Cologne-Stammheim, Germany, assignors to Farbenfabriken Bayer Aktiengesellschaft, Leverkusen, Germany, a German corporation
No Drawing. Filed Dec. 17, 1963, Ser. No. 331,093
Claims priority, application Germany, Dec. 22, 1962, F 38,631
6 Claims. (Cl. 260—881)

The present invention relates to impact-resistant thermoplastic graft co-polymers which have good mechanical properties and good resistance to ageing resp. compositions made from these graft copolymers as well as a process for producing such graft copolymers.

It is known that by mixing a rubber component i.e. both natural rubber and synthetic rubber, with a resin component which by itself forms only hard and brittle polymers (e.g. polystyrene), it is possible to produce synthetic plastics which have practically the same hardness and dimensional stability as the hard and brittle component, but which nevertheless, show a greater insensitivity to shock and impact.

It is also known that grafting a monomer, which by itself is only able to form hard and brittle polymers, on to polybutadiene, it is possible to obtain graft polymers which, on being mixed with a resin component, for example a copolymer of styrene with acrylonitrile, yield synthetic plastics which have an excellent resistance to impact and shock in addition to good hardness and dimensional stability. Finally, it has also been proposed to produce synthetic plastics which have good hardness and dimensional stability by grafting acrylic or methacrylic acid esters, together with styrene and acrylonitrile, on to polybutadiene.

All these impact-resistant plastics, of which the elasticising component is made from butadiene or isoprene, nevertheless have the disadvantage that in time they partially lose their good mechanical properties, since those carbon-carbon double bonds which are still present are attacked by atmospheric oxygen, especially under the action of light and heat.

In order to overcome this disadvantage, synthetic plastics have already been developed in which saturated elastomeric polymers are used as elasticising component, i.e. components which no longer contain any aliphatic carbon-carbon double bonds and which consequently can be less readily aged. Examples of such components include polybutyl acrylate and polyvinyl isobutyl ether. If these polymers are mixed with a resin component, for example polystyrene, in suitable proportions, the impact-resistant plastics obtained in this way, after their shaping, do in fact have good mechanical data, but on the other hand frequently also a very strong orientation. The mechanical properties of such polymer mixtures are then very highly dependent on the flow direction of the material during shaping.

It is also known to produce impact-resistant plastics having good impact toughness values by grafting polymers, such as styrene, or monomer mixtures, such as styrene-acrylonitrile, on to an ester of polyacrylic acid ester and mixing the resulting graft polymers with a resin component, e.g. a copolymer of styrene and acrylonitrile. Here also the mechanical properties of such polymer mixtures are very highly dependent on the flow direction of the material during the shaping.

Furthermore, processes for the production of impact-resistant plastics are known in which monomers or monomer combinations, such as styrene or styrene-acrylonitrile, are grafted on to a copolymer comprising acrylic acid ester and small quantities of a diolefin, for example butadiene or isoprene, and these graft polymers are again mixed with a resin component, e.g. polystyrene. These polymers also lose some of their good mechanical properties over a period of time, since the carbon-carbon double bonds still present in the polymer initiate ageing effects.

Finally, processes for the production of graft polymers have already been proposed in which acrylic or methacrylic acid esters are grafted onto a basic polymer into which sources for free radicals have been incorporated. Usable sources for free radicals in such circumstances are compounds comprising hydroperoxide groupings, for instance polymeric hydroperoxides, as for example polystyrene-hydroperoxide, polyisopropyl-α-methylstyrene hydroperoxide or a copolymer of p-isopropyl-α-methylstyrene and methacrylic acid, which is peroxidised after the copolymerisation.

However, the production of such polymeric hydroperoxides is very complicated and in particular can only be carried into effect with difficulty on an industrial scale, and in addition involves several disadvantages. In particular, graft polymers which already are strongly cross-linked are obtained by copolymerisation of such polymeric hydroperoxides with, for example, vinyl or vinylidene monomers. This is obviously because of the plurality of hydroperoxide groupings which are present generally. This hinders their use on an industrial scale.

It has now been discovered how the aforementioned disadvantages can be avoided.

Accordingly, it is an object of this invention to provide novel graft-copolymer compositions with high impact-strength and ageing-resistance.

Another object is to provide high-impact strength graft copolymers of uncrosslinked character.

Another object is to produce such graft-copolymers resp. graft-copolymer compositions. Still other objects will become apparent as the description proceeds.

The process of this invention comprises mixing—

(A) 5 to 30% by weight, calculated on solids content, of an aqueous emulsion of saturated copolymers consisting of 1–30% by weight of p-isopropyl-α-methylstyrene and 99–70% by weight of an ester of acrylic acid with an alkyl radical of 1–10 carbon atoms and/or an ester of methacrylic acid ester with an alkyl radical of 3–10 carbon atoms, and (B) 95 to 70% by weight of a vinyl or vinylidene monomer—i.e. a monomer having a terminal $CH_2=C<$-group —which by itself forms hard and brittle polymers, or a mixture of such compounds, optionally together with subordinate quantities of other polymerisable vinyl or vinylidene monomers, and this mixture subjecting to a graft copolymerisation, the grafting substratum A containing such an amount of p-isopropyl-α-methylstyrene that the porportion of p-isopropyl-α-methylstyrene in the graft copolymer amounts to at least 0.3 percent by weight.

According to a preferred embodiment, the graft copolymers according to the present invention consist of 10 to 30% by weight of the copolymer mentioned under (A) and serving as grafting substratum and 90 to 70% by weight of the grafting component mentioned under (B) i.e. vinyl or vinylidene monomers forming hard and brittle polymers.

It is preferred that the proportion of p-isopropyl-α-methylstyrene should be within a range from 5 to 15% by weight (calculated on the total quantity of the saturated copolymer of the grafting substratum).

Especially to be considered as copolymerisation components for the production of the grafting substratum (A) are esters of acrylic and/or methacrylic acids, and in the case of the methacrylic acid ester, the esterifying alcohol should contain between 3 and 10 carbon atoms, and in the case of the acrylic acid ester, the said alcohol should contain between 1 and 10 carbon atoms.

Other copolymerisable vinyl or vinylidene compounds can also be incorporated into the grafting substratum, for example styrene, halogenated styrenes, styrenes alkylated on the nucleus; α-methylstyrene and its homoloques, acrylonitrile or methacrylonitrile, vinyl ether or vinyl ester, acrylamide or methacrylamide. When using such compounds however, the proportion of the last-mentioned copolymer component should not replace more than 30% of the acrylic or methacrylic acid ester component.

The grafting substratum or base (A), i.e. the copolymer of p-isopropyl-α-methylstyrene and acrylic or methacrylic acid ester, can be produced by processes known per se, expediently by emulsion polymerisation. Capable of serving as polymerisation activators in such cases are peroxide compounds, for example alkali metal or ammonium persulphates, hydrogen peroxide, organic peroxides such as t-butyl hydroperoxide, cumene hydroperoxide and p-methane hydroperoxide. On the other hand, redox systems can also be employed, more especially those which are based on an inorganic peroxidic compound such as potassium persulphate or ammonium sulphate on the one hand and an acid of sulphur with a low valency stage of the sulphur, as for example sodium pyrosulphite, sodium bisulphate or sodium formaldehyde sulphoxylate, on the other hand. Another redox system which is very suitable is for example one which is based on cumene hydroperoxide and dextrose. The activators or activator systems are employed in normal quantities, i.e. in quantities between approximately 0.1 and 5% based on the total quantity of monomers.

As grafting component (B) i.e. as vinyl or vinylidene monomers which per se are capable of forming hard and brittle polymers, there are for example to be considered: styrene, α-methylstyrene, styrenes alkylated on the nucleus, halogenated styrenes and mixtures of styrenes with up to about 30% of acrylonitrile and/or methacrylonitrile. Small amounts of these graft monomers i.e. up to a maximum of 30% can be replaced by other vinyl or vinlidene monomers which do not form any pronounced hard and brittle polymers, and the following are to be mentioned as examples: methacrylic acid esters, acrylamide or methacrylamide, vinyl chloride and vinylidene chloride.

The grafting, i.e. the production of the graft copolymers, from 5 to 30% by weight of the grafting base (A), i.e. a copolymer of p-isopropyl-α-methylstyrene with acrylic acid esters and 95 to 70% by weight of a polymerisable compound forming hard and brittle polymers or a mixture of such compounds (B) is effected by polymerisation of the components, advantageously in aqueous emulsion. It is thus expedient for the vinyl or vinylidene compound that forms hard and brittle polymers also to be used in aqueous emulsion and to be subjected in this form to the graft copolymerisation with the grafting substratum (A).

According to a preferred form of the present process, the copolymer, which is present in latex form and consists of p-isopropyl-α-methylstyrene and acrylic acid ester, is mixed with the monomer which is to be grafted on or with an emulsion consisting of the monomer, water and emulsifier, the graft monomers are allowed to become attached to the latex particles while stirring for at least two hours and, after the softening which is effected in this way, the polymerisation is started under controlled temperature conditions by adding activators.

Generally speaking, the graft copolymerisation takes place at temperatures from 10 to 80° C., but it is also possible in principle to employ both lower and higher temperatures.

Anionic and also non-ionic and cationic surface-active compounds, in the usual quantities of 0.1 to 15%, can be employed as emulsifiers. The following are to be mentioned as examples of anionic emulsifiers: sodium, potassium or ammonium salts of alkyl-sulphonic acids with 8 to 20 carbon atoms in the alkyl group, salts of resin acids, of the type abietic acid and similar compounds. The following are to be mentioned as non-ionic emulsifiers: reaction products of ethylene oxide with phenols, fatty alcohols, fatty acids and polypropylene oxides.

Also serving as polymerisation catalysts in the case of the graft polymerisation are peroxidic compounds in the aforementioned usual quantities, for example, sodium, potassium or ammonium persulphate, hydrogen peroxide, t-butyl hydroperoxide and cumene hydroperoxide. Redox systems can, however, also be employed, for example potassium persulphate-sodium pyrosulphite, cumene-hydroperoxide-dextrose or potassium persulphate and triethanolamine. Conventional regulators, for example dodecyl mercaptan, can also be added in order to regulate the molecular weight.

The polymerisation is carried out at pH values between 2 and 10 and polymerisation is generally continued until the monomers are completely converted.

The polymerisation can also be so conducted that a part of the monomers is added, in portions or continuously, to the polymerising emulsion. Furthermore, it is possible to begin polymerisation with only a part of the emulsion and to add the remainder continuously to the emulsion.

The graft copolymers obtained according to the present process are preferably obtained by polymerisation in aqueous emulsion and consequently are formed as aqueous polymer dispersions, which present extraordinary stability to coagulation. In addition to the advantages set forth above, the graft copolymers according to the invention show the particular properties which are peculiar to known mixtures of thermoplastic copolymers and elastomeric components without such a mixing being necessary in the present case. This fact does not exclude the possibility of carrying out such a mixing operation in order to produce materials with special properties.

The solid polymers obtained from the graft copolymer dispersions according to the present invention by concentration by freezing, precipitation or concentration by evaporation are thermoplastically-deformable and show excellent resistance to light, heat and oxygen while having very good mechanical properties.

Depending upon the purpose of use, various types of fillers, intensifiers, pigments, such as titanium dioxide, lubricants such as butyl stearate or zinc stearate, plasticisers, stabilisers and similar auxiliaries can be added to the copolymers.

The graft copolymers produced by the present process can be used for the production of various types of moulded elements, in connection with which high standards are set as regards notch impact toughness and ageing resistants, and particular reference is to be made in this connection to moulded elements for use in the electrical industry.

Whereas it is often not possible satisfactorily to mix elastomeric polymers with hard and brittle polymers, since the different components are incompatible with one another or tend to flow orientation, completely homogeneous graft copolymers without appreciable flow orientation are obtained by the process of the invention. The graft polymers obtainable by the present process thus show simultaneously good ageing resistance and also very good mechanical values, more especially notch impact toughness values.

The parts referred to in the following examples are parts by weight, unless otherwise indicated.

*Example 1*

(I) *Production of the grafting base (latex 1A).*—A solution of 5000 parts of salt-free water, 62.5 parts of the sodium salt of paraffin-sulphonic acids with 12 to 18 carbon atoms, 3.75 parts of sodium metabisulphate and 2.5 parts of potassium persulphate is introduced into a pressure-tight stirrer-type vessel. 2312.5 parts of butyl acrylate and 187.5 parts of p-isopropyl-α-methylstyrene are thereafter emulsified in this solution. The air is displaced by introduction of nitrogen and then the temperature is raised to 40 to 45° C. The polymerisation which starts immediately is complete after 20 hours. The concentration of polymer in the latex 1A which is obtained is 31%.

(II) *Graft copolymerisation.*—1210 parts of the previously obtained 31% latex 1A are mixed with 2135 parts of salt-free water in a glass polymerisation vessel equipped with a stirrer, thermometer, reflux condenser and gas admission tube. 1125 parts of styrene are emulsified in this mixture. After stirring for 2 hours at room temperature, the air is displaced by introducing nitrogen and the reaction mixture is heated to 30° C. After adding 2 parts of potassium persulphate dissolved in 40 parts of wolfatite-softened water, the temperature is raised after another hour to 50–55° C. The polymerisation which starts immediately is complete after 16 hours. The polymer dispersion which has formed has a concentration of 32%.

The polymer is coagulated by pouring into a 2% CaCl$_2$ precipitation liquor. The granular coagulate is filtered off, washed and dried at 70 to 80° C. under reduced pressure. The powder is consolidated on a roll stand heated to 160° C. into a sheet which is ground to form a granulated material. Standard small bars are produced from the granulated material by injection moulding, the values established in respect of these bars being set out in Table I.

In the following comparison Example A, there is described the production of a moulding composition in which no p-isopropyl-α-methylstyrene had been incorporated by polymerisation into the grafting base.

*Comparison Example A.*—The mixing according to Example 1 is repeated with a single modification. A copolymer of 92.5 parts of butyl acrylate and 7.5 parts of p-isopropyl-α-methylstyrene is not used as grafting base, but instead a pure butyl polyacrylate polymer.

The polymer is worked up in the same manner as already indicated in Example 1. However, differing from the moulding composition described in Example 1, the resulting powder, on being processed on a roll stand at a temperature of 160° C., shows a very much less satisfactory gelling and simultaneously a very much less satisfactory sheet formation, i.e. the sheet shows a conspicuously rough surface and a non-homogeneous crumbly structure. After being granulated, standard small bars are also produced from this moulding composition and the mechanical values of these bars are likewise set out in Table I.

It is indicated in the following comparison Example B, that the mixture of a copolymer of 92.5 parts of butyl acrylate with 7.5 parts of p-isopropyl-α-methylstyrene and polystyrene provides a moulding composition which also has only a very low impact toughness in addition to very poor workability.

*Comparison Example B.*—758 parts of the approximately 31% latex 11A are mixed with 2440 parts of a 31% polystyrene latex. The ratio of the solid substances is also once again 25:75. This latex mixture was worked up in the same manner as already indicated in Example I. The powder formed after drying can only be consolidated into a sheet with very great difficulty on a roll stand heated to 160° C. and the standard small bars produced after granulation by means of the injection moulding process show a very strong orientation. The mechanical values of these bars are likewise indicated in Table I.

TABLE I

|  | Ex. 1 | Comparison Ex. A | Comparison Ex. B |
|---|---|---|---|
| Notched impact strength, kp. cm./cm.$^2$, DIN 53,453 at 20° C | 16.3 | 13.0 | 12.5 |
| Impact strength, kp. cm./cm.$^2$, DIN 53,453 at 20° C | (¹) | 34.6 | 30.0 |
| Ball indentation hardness, kp./cm.$^2$, DIN-draft 53,456 | 500 | 370 | 360 |
| Comment | | (²) | (³) |

¹ Unbroken.
² Material shows fibrous structure. Poor workability.
³ Material shows strong orientation and very poor workability.

*Example 2*

Using the glass polymerisation vessel already described in Example 1, 1136 parts of an approximately 33% latex of a copolymer of 90 parts of butyl acrylate and 10 parts of p-isopropyl-α-methylstyrene are mixed with 2208 parts of salt-free water and 901 parts of styrene and 224 parts of acrylonitrile are emulsified in this mixture. After stirring for two hours at room temperature, the air is displaced by introducing nitrogen. After heating the reaction mixture to 30° C., 2 parts of potassium persulphate dissolved in 40 parts of water are added. Over a period of one hour, the temperature of the emulsion is now raised to 50 to 55° C. The polymerisation reaction starts very rapidly and is complete after 16 hours. The polymer dispersion which has formed has a concentration of 33%.

The further working up is effected as already described in Example 1. After the rolling, granulation and the production of the standard small bars, the moulding composition thus obtained had the values indicated in Table II.

The excellent resistance to ageing of the products according to the invention is shown by comparison with a moulding composition in which a copolymer of butadiene and acrylonitrile was employed as grafting base.

*Comparison Example C.*—Using the glass polymerisation vessel already described in Example 1, 1137 parts of a 33% latex of a copolymer of 93 parts of butadiene and 7 parts of acrylonitrile are mixed with 2238 parts of water. 901 parts of styrene and 224 parts of acrylonitrile are now emulsified in this mixture. After displacing the air by nitrogen, adding 1.5 parts of potassium persulphate dissolved in 10 parts of wolfatite-softened water, the temperature is raised to 55 to 60° C.

Polymerisation starts at once and is terminated after about 16 hours. The polymer dispersion which has formed has a solids concentration of 32%.

The working up and the further processing are effected in the manner already described in Example 1 and the values established in respect of the standard small bars are set out in Table II.

TABLE II

|  | Example 2 | Comparison Example C |
|---|---|---|
| Notch impact strength, kp. cm./cm.$^2$, DIN 53,453 at 20° C | 18.8 ¹ (18.8) | 10.0 ¹ (3.5) |
| Indentation hardness, kp./cm.$^2$ DIN draft 53,456 | 500 ¹ (500) | 490 ¹ (490) |

¹ Values after an ageing for 30 days in an oxygen atmosphere at 70° C. (oxygen pressure 21 atm.).

The butadiene-containing moulding composition of the comparison Example C shows a very considerable drop in the notch impact toughness after 30 days, whereas the moulding composition produced by the process of the invention does not experience any modification.

*Comparison Example D.*—In an experiment carried out by comparison with Example 2, the copolymer of butyl acrylate with p-isopropyl-α-methylstyrene as grafting base was replaced by a homopolymer of butyl acrylate. The product obtained showed a substantially less satisfactory workability on the roller than the product according to the invention as set out in Example 2. Using standard small bars a notch impact strength of 9.4 kp. cm./cm.² and a ball-indentation hardness of 395 kp./cm.² were measured.

*Examples 3–5*

Using the glass polymerisation vessel already described in Example 1, 1130 parts of a 33% latex of a copolymer of 90 parts of butyl acrylate and 10 parts of p-isopropyl-α-methylstyrene are mixed 220 parts of wolfatite-softened water. The monomer mixtures set out in the following table and, in each example, 1.5 parts of t-dodecyl mercaptan are emulsified in this mixture.

| Example* | 3 | 4 | 5 |
| --- | --- | --- | --- |
| Styrene | 1,013 | 957 | 845 |
| Acrylonitrile | 112 | 168 | 280 |

*The numbers indicated represent parts by weight.

After stirring for two hours at room temperature, the air is displaced by introducing nitrogen and the reaction mixture is heated to 30° C. After adding 1.5 parts of potassium persulphate dissolved in 30 parts of wolfatite-softened water and after another hour has elapsed, the temperature is raised to 50 to 55° C. The polymerisation starts immediately and is terminated after about 16 hours. The latex formed has a solids concentration of 33%. The working up of the polymer mixtures obtained in this way takes place in the same manner as already described in Example 1. After rolling and granulation, standard small bars are again produced by means of the injection moulding process and the values established with these bars are set out in Table III.

TABLE III

| Experiment No. | Ex. 3 | Ex. 4 | Ex. 5 |
| --- | --- | --- | --- |
| Notched impact strength, kp. cm./cm.², DIN 53,453 at 20° C | 21.2 | 13.8 | 12.5 |
| Flexural stress at a given deflection, kp./cm.², DIN 53,452 | 519 | 556 | 463 |
| Indentation hardness, kp./cm.², DIN draft 53,456 | 430 | 465 | 455 |

*Examples 6–8*

Using the glass polymerisation vessel already described in Example 1, 1137 parts of a 33% latex of a copolymer of 70 parts of butyl acrylate, 20 parts of ethyl acrylate and 10 parts of p-isopropyl-α-methylstyrene are mixed in 2213 parts of salt-free water. The monomer mixtures set out in the following table and also, in each example, 1.5 parts of t-dodecyl mercaptan are emulsified in this mixture.

| Example | Styrene | Acrylonitrile |
| --- | --- | --- |
| 6 | 1,125 | |
| 7 | 956 | 169 |
| 8 | 900 | 225 |

NOTE: The numbers indicated represent parts by weight.

After stirring for two hours at room temperature, the air is displaced by introducing nitrogen and the emulsion is heated to 30° C. After adding 1.5 parts of potassium persulphate dissolved in 30 parts of wolfatite-softened water, the temperature is raised after 1 hour to 50 to 55° C. Polymerisation starts at once and is terminated after about 16 hours and the latex which has formed has a solids concentration of 33%.

The working up of the polymer and also the further processing to standard small bars is effected in the same manner as already repeatedly described.

Table IV sets the mechanical values established in respect of these standard small bars.

TABLE IV

| Experiment No. | Ex. 6 | Ex. 7 | Ex. 8 |
| --- | --- | --- | --- |
| Notch impact strength, kp. cm./cm.², DIN 53,453 at 20° C | 7.5 | 28.1 | 23.8 |
| Flexural stress at a given deflection, DIN 53,452 | 550 | 506 | 525 |
| Indentation hardness, kp./cm.², DIN-draft 53,456 | 430 | 455 | 450 |

What we claim is:
1. A process for the production of an impact-resistant thermoplastic graft copolymer which comprises polymerizing in the presence of a free radical forming monomeric catalyst (A) 5 to 30% by weight, based on solids content, of an emulsion of a saturated copolymer grafting substratum of 1 to 30% by weight of p-isopropyl-α-methylstyrene and 99 to 70% by weight of an ester selected from the group consisting of alkylacrylate having 2–10 carbon atoms in the alkyl group and alkylmethacrylate having 3–10 carbon atoms in the alkyl group, and (B) 95 to 70% by weight, based on solids content, of at least one monomer selected from the group consisting of styrene, α-methylstyrene, styrene alkylated on the nucleus, halogenated styrene and mixtures of said styrenes with up to about 30% by weight of at least one member selected from the group consisting of acrylonitrile and methacrylonitrile, the p-isopropyl-α-methylstyrene content of said grafting substratum being in such proportion that said graft copolymer contains at least 0.3% by weight thereof.

2. The process of claim 1, wherein said ester of said grafting substratum is an alkyl acrylate and said grafting substratum is obtained by emulsion polymerization and contains 5 to 15% by weight of p-isopropyl-α-methylstyrene.

3. The process of claim 1, wherein said ester of said grafting substratum is an alkylmethacrylate and said grafting substratum is obtained by emulsion polymerization and contains 5 to 10% by weight of isopropyl-α-methylstyrene.

4. An impact-resistant thermoplastic graft copolymer of (A) 5 to 30% by weight, based on solids content, of an emulsion of a saturated copolymer grafting substratum of 1 to 30% by weight of p-isopropyl-α-methylstyrene and 99 to 70% by weight of an ester selected from the group consisting of alkylacrylate having 2–10 carbon atoms in the alkyl group and alkylmethacrylate having 3–10 carbon atoms in the alkyl group, and (B) 95 to 70% by weight, based on solids content, of at least one monomer selected from the group consisting of styrene, α-methylstyrene, styrene alkylated on the nucleus, halogenated styrene and mixtures of said styrenes with up to about 30% by weight of at least one member selected from the group consisting of acrylonitrile and methacrylonitrile, the p-isopropyl-α-methylstyrene content of said grafting substratum being in such proportion that said graft copolymer contains at least 0.3% by weight thereof.

5. The impact-resistant thermoplastic graft copolymer of claim 4 wherein said ester of said grafting substratum is an alkylacrylate and said graft copolymer contains 5 to 15% by weight of isopropyl-α-methylstyrene.

6. The impact-resistant thermoplastic graft copolymer of claim 4 wherein said ester of said grafting substratum is an alkylmethacrylate and said graft copolymer contains 5 to 10% by weight of isopropyl-α-methylstyrene.

References Cited by the Examiner

UNITED STATES PATENTS

| | | | |
|---|---|---|---|
| 2,837,496 | 6/1958 | Vandenburg | 260—886 |
| 2,961,421 | 11/1960 | Cohen et al. | 260—885 |
| 2,965,572 | 12/1960 | Wuellner et al. | 260—885 |
| 3,041,308 | 6/1962 | Baer | 260—885 |

MURRAY TILLMAN, *Primary Examiner.*

SAMUEL H. BLECH, *Examiner.*

J. T. GOOLKASIAN, *Assistant Examiner.*